(12) United States Patent
Kameda et al.

(10) Patent No.: US 8,601,805 B2
(45) Date of Patent: Dec. 10, 2013

(54) POWER GENERATING APPARATUS OF RENEWABLE ENERGY TYPE

(75) Inventors: Takuro Kameda, Tokyo (JP); Yu Akashi, Tokyo (JP); Takeshi Matsuo, Tokyo (JP); Shinsuke Sato, Tokyo (JP); Yoshiyuki Morii, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/398,484

(22) Filed: Feb. 16, 2012

(65) Prior Publication Data

US 2012/0255291 A1     Oct. 11, 2012

(30) Foreign Application Priority Data

Apr. 5, 2011   (WO) .................. PCT/JP2011/058647

(51) Int. Cl.
   *F03D 11/00*          (2006.01)
(52) U.S. Cl.
   USPC .............................................. 60/398; 60/487
(58) Field of Classification Search
   USPC ........................................ 60/398; 290/44, 55
   See application file for complete search history.

(56) References Cited

U.S. PATENT DOCUMENTS

| | | |
|---|---|---|
| 2,701,146 A | 2/1955 | Warren |
| 2,706,255 A | 4/1955 | Breaux et al. |
| 3,030,118 A | 4/1962 | Groce |
| 3,547,556 A | 12/1970 | Keene |
| 3,943,717 A | 3/1976 | Schexnayder |
| 4,280,061 A | 7/1981 | Lawson-Tancred |
| 7,183,664 B2 | 2/2007 | McClintic |
| 7,418,820 B2 * | 9/2008 | Harvey et al. ................... 60/398 |
| 7,436,083 B2 * | 10/2008 | Shibata et al. .................. 290/44 |
| 7,436,086 B2 | 10/2008 | McClintic |
| 7,569,943 B2 | 8/2009 | Kovach et al. |
| 7,615,884 B2 * | 11/2009 | McMaster ....................... 60/398 |

(Continued)

FOREIGN PATENT DOCUMENTS

| | | |
|---|---|---|
| CN | 201747854 U | 2/2011 |
| CN | 201982255 U | 9/2011 |

(Continued)

OTHER PUBLICATIONS

PCT, "International Search Report and Written Opinion issued in PCT/JP20111071674 (translation only)", Dec. 27, 2012.

(Continued)

*Primary Examiner* — Thomas E Lazo
(74) *Attorney, Agent, or Firm* — Manabu Kanesaka; Kenneth M. Berner; Benjamin J. Hauptman

(57) ABSTRACT

A power generating apparatus of renewable energy includes a tower, a nacelle provided at the tower, a main shaft housed in the nacelle and rotating with a blade, a hydraulic pump housed in the nacelle and connected to the main shaft, a hydraulic motor driven by operating oil supplied from the hydraulic pump, a generator connected to the hydraulic motor, and a piping between the hydraulic pump and the hydraulic motor. The hydraulic motor is housed in at least one of the nacelle and the end part of the tower, the generator is housed in at least one of the nacelle and the end part of the tower, and at least one of the hydraulic motor and the generator is arranged in a space excluding an area between the main shaft and the hydraulic pump; and a rear end wall surface of a wall of the nacelle.

18 Claims, 12 Drawing Sheets

(56) References Cited

U.S. PATENT DOCUMENTS

| | | | |
|---|---|---|---|
| 7,656,055 B2 | 2/2010 | Torres et al. | |
| 7,863,767 B2* | 1/2011 | Chapple et al. | 60/398 |
| 7,918,632 B2 | 4/2011 | Mogensen et al. | |
| 8,181,455 B2* | 5/2012 | Tsutsumi et al. | 60/398 |
| 2005/0155346 A1* | 7/2005 | Nikolaus | 60/398 |
| 2008/0047271 A1* | 2/2008 | Ingersoll | 60/398 |
| 2008/0308980 A1 | 12/2008 | Mitsch | |
| 2009/0129953 A1 | 5/2009 | Andersen | |
| 2009/0140522 A1* | 6/2009 | Chapple et al. | 290/43 |
| 2010/0032959 A1 | 2/2010 | Nies | |
| 2010/0133817 A1 | 6/2010 | Kinzie et al. | |
| 2010/0270809 A1* | 10/2010 | Dahlhaug | 290/55 |
| 2010/0320770 A1* | 12/2010 | Dahlhaug | 290/55 |
| 2011/0012362 A1* | 1/2011 | Kawai et al. | 290/55 |
| 2011/0012365 A1 | 1/2011 | Becker | |
| 2011/0097202 A1 | 4/2011 | De Buhr et al. | |
| 2011/0109094 A1 | 5/2011 | Kenway et al. | |
| 2011/0142616 A1 | 6/2011 | Christensen | |

FOREIGN PATENT DOCUMENTS

| | | |
|---|---|---|
| EP | 0945613 A2 | 3/1999 |
| EP | 0959287 A2 | 11/1999 |
| EP | 1566543 A1 | 2/2005 |
| EP | 1677000 A2 | 12/2005 |
| EP | 1677001 A2 | 12/2005 |
| EP | 2003362 A2 | 6/2008 |
| EP | 2196668 A2 | 6/2010 |
| EP | 2317137 A1 | 5/2011 |
| EP | 2322795 A2 | 5/2011 |
| EP | 2395233 A2 | 5/2011 |
| EP | 2375066 A1 | 10/2011 |
| JP | S59-28136 Y | 8/1984 |
| JP | S61-212674 A | 9/1986 |
| JP | S62-20678 A | 1/1987 |
| JP | 2005-248738 A | 9/2005 |
| JP | 4181041 B2 | 9/2008 |
| JP | 2009-503339 A | 1/2009 |
| JP | 2009-513882 A | 4/2009 |
| WO | WO9703288 A1 | 1/1997 |
| WO | WO2007053036 A1 | 5/2007 |
| WO | WO 2008-113699 A2 | 9/2008 |
| WO | WO2009000306 A1 | 12/2008 |
| WO | WO 2009/025420 A1 | 2/2009 |
| WO | WO 2009/058022 A1 | 5/2009 |
| WO | WO 2009/061209 A1 | 5/2009 |
| WO | WO 2009/064192 A1 | 5/2009 |
| WO | WO2010033035 A1 | 3/2010 |
| WO | WO2010070450 A2 | 6/2010 |
| WO | WO2010102636 A2 | 9/2010 |
| WO | WO2011051272 A2 | 5/2011 |
| WO | WO2011104544 A2 | 9/2011 |
| WO | WO2011117005 A2 | 9/2011 |

OTHER PUBLICATIONS

Korean Patent Office, "Notice of Allowance issued in KR10-2012-7034038 and its translation", dated Jun. 11, 2013.
Japan Patent Office, "Notice of Allowance issued in JP2012-507508 and its translation", Jul. 31, 2013.
Japan Patent Office, "Notice of Allowance issued in JP2011-554017 and its translation", dated Feb. 16, 2012 X.
PCT, "International Search Report and Written Opinion issued in PCT/JP2011/058647 and its translation", Jul. 19, 2011.
USPTO, "Office Action issued in U.S. Appl. No. 13/161,822", Mar. 19, 2012.
USPTO, "Notice of Allowance issued in U.S. Appl. No. 13/161,822" Oct. 9, 2012.
EPO, "European Search Report issued in 11797295.0", Jun. 13, 2013.
USPTO, "Notice of Allowance issued in U.S. Appl. No. 13/161,822", Nov. 23, 2012.
PCT, "International Search Report and Written Opinion issued in PCT/JP2012/070492 and its translation", Nov. 27, 2012.
PCT, "International Search Report and Written Opinion issued in PCT/JP2012/073589 and its translation", Dec. 28, 2012.
PCT, "International Search Report issued in PCT/JP2011/006695", Feb. 20, 2012.
PCT, "International Preliminary Report on Patentability issued in PCT/JP2011/006695", Jun. 13, 2013.
PCT, "Extended European Search Report issued in European application No. 13160517.2", May 21, 2013 (EP13160517.2 is a divisional application of EP11799883.1, which corresponds to PCT/JP2011/006695).
Japan Patent Office, "Office Action issued in JP2012-507512 and its translation", Aug. 19, 2013.
European Patent Office, "Extended European Search Report for EP 11 81 7195", Sep. 27, 2013.
The International Bureau of WIPO, "International Preliminary Report on Patentability for PCT/JP2011/058647", Oct. 8, 2013.
The International Bureau of WIPO, "International Preliminary Report on Patentability for PCT/JP2011/071674", Oct. 8, 2013.

* cited by examiner

POWER GENERATING APPARATUS OF RENEWABLE ENERGY TYPE

TECHNICAL FIELD

The present invention relates to a power generating apparatus of renewable energy type which transmits rotation energy of a rotor to a generator via a hydraulic transmission including a hydraulic pump and a hydraulic motor. The power generating apparatus of renewable energy type generates power from renewable energy such as wind, tidal current, ocean current and river current and, the power generating apparatus of renewable energy type, for instance, includes a wind turbine generator, a tidal generator, an ocean current generator, a river current generator or the like.

BACKGROUND ART

In recent years, from a perspective of preserving the environment, it is becoming popular to use a power generating apparatus of renewable energy type such as a wind turbine generator utilizing wind power and renewable energy type turbine generator such as a tidal current generator utilizing tidal. In the power generating apparatus of renewable energy type, the kinetic energy of the wind, tidal current, river current or the like is converted to the rotation energy of the rotor and the rotation energy of the rotor is then converted into electric power by the generator.

In this type of conventional power generating apparatus of renewable energy type, a rotation speed of the rotor is small compared to the rated rotation speed of the generator and thus, a mechanical gearbox is provided between the rotor and the generator to increase the rotation speed of the rotor to the rated rotation speed of the generator and then input the increased rotation speed to the generator.

However, as the power generating apparatus of renewable energy type increases in size for the purpose of enhancing the power generation efficiency, weight and cost of the gearbox tends to increase as well. Thus, a power generating apparatus equipped with the hydraulic transmission having the hydraulic pump and the hydraulic motor, instead of the mechanical gearbox, is becoming popular.

For instance, in Patent Literature 1, a power production system transmits rotation energy of a rotor to a generator via a hydraulic transmission. This system is configured such that a hydraulic motor and the generator are provided in a nacelle (see FIG. 7 of Patent Literature 1).

Further, in Patent Literature 1, a wind turbine generator is configured such that a hydraulic motor arranged at a bottom of a tower turns with a nacelle around a vertical axis.

Furthermore, in Patent Literature 3 and Patent Literature 4, disclosed is a wind turbine generator in which a part of a hydraulic piping (a high pressure oil path and a low pressure oil path) turns with a nacelle, the hydraulic piping connecting a hydraulic pump arranged in the nacelle and a hydraulic motor arranged at a bottom of a tower. In this wind turbine generator, a hydraulic swivel arranged at a bottom of the nacelle allows the hydraulic piping on the nacelle side to turn with the nacelle. The hydraulic swivel consists of an outer element and an inner element which are rotatable relative to each other. The piping arranged on the inner element is in communication with an annular path provided in an inner periphery of the outer element.

CITATION LIST

Patent Literature

[Patent Literature 1] WO 2007/053036
[Patent Literature 2] WO 2009/064192
[Patent Literature 3] WO 2009/061209
[Patent Literature 4] WO 2009/058022

SUMMARY OF INVENTION

Technical Problem

In the power production system of Patent Literature 1, the hydraulic motor and the generator are arranged between the hydraulic pump and a rear-side wall, resulting in increased length of the nacelle in the longitudinal direction of the main shaft. Accordingly, the nacelle increases in size and weight.

Further, there is no detailed disclosure in Patent Literature 2 as to how the hydraulic pump arranged in the nacelle and the hydraulic motor arranged at the bottom of the tower are connected.

Furthermore, in Patent Literature 3 and Patent Literature 4, the hydraulic swivel for swiveling the hydraulic piping on the nacelle side and the nacelle together is disclosed. However, there is no detailed description as to how the piping provided in the inner element and the annular path provided in the outer element are connected, and there is not sufficient disclosure on a detailed structure of the hydraulic swivel. Furthermore, as both of the hydraulic motor and the generator are arranged at the bottom of the tower, the hydraulic piping from the hydraulic motor is inevitably long.

In view of the above issues of related art, it is an object of the present invention is to provide a power generating apparatus of renewable energy type where a piping between a hydraulic pump and a hydraulic motor is reduced in length and a nacelle is reduced in size and weight.

Solution to Problem

The present invention provides a power generating apparatus of renewable energy type which generates power from renewable energy and the apparatus may include, but is not limited to:
a tower;
a nacelle which is provided at an end part of the tower;
a main shaft which is housed in the nacelle and rotates with a blade;
a hydraulic pump which is housed in the nacelle and is connected to the main shaft;
a hydraulic motor which is driven by operating oil supplied from the hydraulic pump;
a generator which is connected to the hydraulic motor; and
a piping which is provided between the hydraulic pump and the hydraulic motor to circulate the operating oil, and
the hydraulic motor may be housed in at least one of the nacelle and an end part of the tower,
the generator may be housed in at least one of the nacelle and the upper end part of the tower, and
at least one of the hydraulic motor and the generator may be arranged in a space excluding an area between: the main shaft and the hydraulic pump; and a rear end wall surface of a wall of the nacelle, the rear end wall surface being on a side farther from the blade.

According to this power generating apparatus of renewable energy type, the hydraulic motor is housed in at least one of the nacelle and an end part of the tower and the generator is housed in at least one of the nacelle and the end part of the tower. Thus, in comparison to the case where the hydraulic motor and the generator are both arranged in the base part of the tower, it is possible to reduce the length of the piping in which the operating oil circulates.

Further, in this power generating apparatus of renewable energy type, at least one of the hydraulic motor and the generator is arranged in the space excluding the area between: the main shaft and the hydraulic pump; and the rear end wall surface of the wall of the nacelle. Thus, in comparison to the case where the hydraulic motor and the generator are arranged in the area between: the main shaft and the hydraulic pump; and the rear end wall surface of the wall of the nacelle, it is possible to reduce the length of the nacelle (in the direction of the main shaft), hence reducing the nacelle in size and weight.

The above power generating apparatus of renewable energy type may further include;

a yaw drive unit which is provided at a lower part of the nacelle to turn the nacelle, and at least one of the hydraulic motor and the generator may be arranged above the yaw drive unit and lateral to the hydraulic pump.

By arranging at least one of the hydraulic motor and the generator above the yaw drive unit and lateral to the hydraulic pump, it is possible to use an interior of the nacelle efficiently. Further, without increasing the width of the nacelle (in a direction perpendicular to the main shaft in a horizontal plane), at least one of the hydraulic motor and the generator can be arranged in the nacelle, thereby achieving further reduction of weight and size of the nacelle.

In the above power generating apparatus of renewable energy type, the hydraulic motor and the generator may be housed in the nacelle and may be arranged in a substantially horizontal direction, and at least a part of the hydraulic motor and the generator being connected to each other via an output shaft, may be arranged lateral to the hydraulic pump.

By housing the hydraulic motor and the generator in the nacelle, it is possible to reduce the length of the piping in which the operating oil circulates. Further, by arranging the hydraulic motor and the generator in the substantially horizontal direction, and arranging at least a part of the hydraulic motor and the generator lateral to the hydraulic pump, it is possible to use the interior of the nacelle efficiently and to further reduce the size and weight of the nacelle.

In the above power generating apparatus of renewable energy type, the nacelle may be supported rotatably in a yaw direction with respect to the tower, the hydraulic motor and the generator may be supported on a nacelle side by a support member and the hydraulic motor may be connected to the hydraulic pump by the piping so that the hydraulic motor is immovable relative to the hydraulic pump in the yaw direction, and at least a part of the hydraulic motor and the generator being connected to each other via an output shaft, is arranged in an upper part of the tower.

By supporting the nacelle rotatably in a yaw direction with respect to the tower, and arranging at least a part of the hydraulic motor and the generator in the upper part of the tower, the piping in which the operating oil circulates can be short in comparison to the case where the hydraulic motor and the generator are arranged in the base part of the tower. Further, by arranging at least one of the hydraulic motor and the generator on the tower side, it is possible to further reduce the size and weight of the nacelle.

In such case, in the above power generating apparatus of renewable energy type, the hydraulic motor may be housed in the nacelle, and the hydraulic motor and the generator may be arranged so that the output shaft is disposed vertically.

By housing the hydraulic motor in the nacelle, the hydraulic motor can be arranged near the hydraulic pump and the piping in which the operating oil flow can be reduced in length. Meanwhile, at least a part of the generator is arranged on the tower side. By arranging the hydraulic motor and the generator in the vertical direction, the hydraulic motor and the generator can be easily installed without increasing the diameter of the tower.

In the above case where the power generating apparatus of renewable energy type is provided with the yaw drive unit, the hydraulic motor may be supported on the nacelle side by a support member and is arranged in the upper part of the tower.

By arranging the hydraulic motor in the upper part of the tower, it is possible to further reduce the size and weight of the nacelle. In such case, the hydraulic motor is supported on the nacelle side by the support member and thus, it is possible to rotate the hydraulic motor and the piping between the hydraulic pump and the hydraulic motor integrally with the hydraulic pump.

The above power generating apparatus of renewable energy type may further include:

at least one support member which is supported by the tower, and at least one of the hydraulic motor and the generator may be fixed to the support member, and one end of the piping connected to the hydraulic pump and other end of the piping connected to the hydraulic motor may be rotatably connected relative to each other in a yaw direction.

By this, at least one of the hydraulic motor and the generator can be firmly fixed to the tower. Further, the hydraulic motor and the generator are connected by the output shaft and thus, in the case where one of the hydraulic motor and the generator is fixed to the tower via the support member, the other of the hydraulic motor and the generator can be supported on the tower side. Furthermore, the one end of the piping connected to the hydraulic pump and the other end of the piping connected to the hydraulic motor are rotatably connected relative to each other in the yaw direction and thus, the piping structure can be properly maintained even when the nacelle turns.

In such case, the above power generating apparatus of renewable energy type may further include:

a plurality of first pipings which are supported on a nacelle side and are connected to the hydraulic pump; and a plurality of second pipings which are disposed father from the nacelle than the first pipings and which are fitted to the first pipings, and the first pipings supported on the nacelle side may be rotatably connected to the second pipings, high pressure oil discharged from the hydraulic pump may flow in a first flow path formed by putting at least one set of the first piping and the second piping into communication, and low pressure oil discharged from the hydraulic motor may flow in a second flow path formed by putting at least one of remaining sets of the first piping and the second piping into communication.

By rotatably connecting the first piping and the second piping together, the relative rotation between the piping on the nacelle side and the piping on the tower side can be achieved while maintaining the flow of the operating oil flowing from the hydraulic pump to the hydraulic motor and the flow of the operating oil flowing from the hydraulic motor to the hydraulic pump.

Further, in the above case, in the above power generating apparatus of renewable energy type,
in at least one of the first flow path and the second flow path, a cable extending between the nacelle and the tower may be housed, and
the cable may be covered by a covering tube which the operating oil is prevented from entering.

By housing the cable in at least one of the first flow path and the second flow path, it is possible to protect the cable from damages even when the nacelle turns. The cable may be a power cable for supplying power to electric devices such as the hydraulic pump arranged in the nacelle or a signal cable for controlling the electric devices, a signal cable connected to each measuring device attached to the nacelle side, or a lightning protection cable for grounding in the event of lightning striking the blade or the nacelle.

Furthermore, in the above case, the above power generating apparatus of renewable energy type may further include:
a first double tube which includes a first inner tube and a first outer tube connected to the hydraulic pump and which is supported on the nacelle side and extends through an interior of the tower toward a base part of the tower; and
a second double tube which includes a second inner tube and a second outer tube connected to the hydraulic motor and which is disposed farther from the nacelle than the first double tube and is fitted to the first double tube, and
the first inner tube may be in communication with the second inner tube to form an inner flow path,
the first outer tube may be in communication with the second outer tube to form an outer flow path,
low pressure oil discharged from the hydraulic motor to the hydraulic pump may flow in one of the inner flow path and the outer flow path,
high pressure oil discharged from the hydraulic pump to the hydraulic motor may flow in the other of the inner flow path and the outer flow path, and
the first double tube supported on the nacelle side may be connected rotatably to the second double tube.

By rotatably connecting the first double tube supported on the nacelle side rotatably to the second double tube, the flow of the operating oil can be maintained between the nacelle and the tower and the relative rotation between the piping on the nacelle side and the piping on the tower side can be achieved. By forming the inner flow path by the first inner tube and the second inner tube and forming the outer flow path by the first outer tube and the second outer tube, the low pressure oil flows in one of the inner flow path and the outer flow path and the high pressure oil flows in the other of the inner flow path and the outer flow path. Thus, the flow of the operating oil from the hydraulic pump to the hydraulic motor and the flow of the operating oil from the hydraulic motor to the hydraulic pump can be secured, respectively.

In such case, the above power generating apparatus of renewable energy type may further include:
an inner seal which seals a space between a tube wall of the first inner tube and a tube wall of the second inner tube, and
the inner seal may be interposed between the inner flow path and the outer flow path.

By arranging the inner seal between the tube wall of the first inner tube and the tube wall of the second inner tube, even if the sealing function of the inner seal fails, the high pressure oil flowing in the inner flow path leas to the outer flow path. Thus, the leaking of the high pressure oil to the outside is prevented.

The above power generating apparatus of renewable energy type may further include:

a pair of outer seals which seal a space between a tube wall of the first outer tube and a tube wall of the second outer tube;
an oil reservoir which communicates with the pair of outer seals; and
a tank which communicates with the oil reservoir.

By this, even if the sealing function of the seal between the tube wall of the first outer tube and the tube wall of the second outer tube fails, the low pressure oil leaking from the outer flow path is led to the tank via the oil reservoir. More specifically, the low pressure oil leaking from the outer flow path is collected in the tank after its pressure is sufficiently reduced. Thus, the leaking of the low pressure oil to the outside can be prevented.

The above power generating apparatus of renewable energy type may further include:
a bearing which rotatably supports the first double tube to the second double tube and which receives at least one of a thrust load and a radial load along a longitudinal direction and a radial direction, respectively, of the first and second double tubes.

By rotatably supporting the first double tube to the second double tube via the bearing, the first double tube can turn without hindrance in accordance to the turning of the nacelle.

The bearing can firmly receive the thrust load such as the weight of the first double tube and a hydraulic thrust caused by the high pressure oil and the low pressure oil flowing in the inner flow path 151 and the outer flow path, or the radial load.

Further, in the above power generating apparatus of renewable energy type,
the first double tube and the second double tube may be fitted so that the first inner tube and the second inner tube are relatively slidable in a longitudinal direction and the first outer tube and the second outer tube are relatively slidable in the longitudinal direction.

By fitting the first double tube and the second double tube so that the first inner tube and the second inner tube are relatively slidable in the longitudinal direction and the first outer tube and the second outer tube are relatively slidable in the longitudinal direction, it is possible to allow the first double tube to move relative to the second double tube in the longitudinal direction and thus, the heat expansion of the first double tube and the second double tube caused by an increase in the oil temperature or the like can be absorbed.

Furthermore, the above power generating apparatus of renewable energy type may further include:
an anti-pulsation accumulator which is provided in the nacelle between the hydraulic pump and the first double tube to prevent pulsation of the hydraulic pump.

By providing the anti-pulsation accumulator in the nacelle, the distance between the anti-pulsation accumulator and the hydraulic pump can be shorter and the pulsation of the hydraulic pump can be effectively prevented. As the capacity of the anti-pulsation accumulator may be comparatively small, there is enough space for the anti-pulsation accumulator to be housed in the nacelle.

Further, in the above case, in the above power generating apparatus of renewable energy type,
the hydraulic motor and the generator may be housed in the tower, and
the hydraulic motor and the generator may be disposed in a substantially vertical direction.

By housing the hydraulic motor and the generator in the tower, it is possible to further reduce the size and the weight of the nacelle, which houses neither the hydraulic motor nor the generator. By disposing the hydraulic motor and the generator in the substantially vertical direction, the hydraulic motor and the generator can be installed in the tower without increasing the diameter of the tower.

Furthermore, the power generating apparatus of renewable energy type may be a wind turbine generator, the tower may extend vertically upward from a base part toward the end part, and the main shaft may be rotated by wind received by the blade.

In the above power generating apparatus of renewable energy type, the hydraulic motor may be connected to the generator via a flexible joint.

By connecting the hydraulic motor and the generator using the flexible joint having flexibility, it is possible to enhance a degree of freedom in the relative-position relationship between the hydraulic motor and the generator, and also to adjust the positions of the hydraulic motor and the generator easily.

Advantageous Effects of Invention

According to the power generating apparatus of renewable energy type of the present invention, the hydraulic motor is housed in at least one of the nacelle and an end part of the tower and the generator is housed in at least one of the nacelle and the end part of the tower. Thus, in comparison to the case where the hydraulic motor and the generator are both arranged in the base part of the tower, it is possible to reduce the length of the piping in which the operating oil circulates.]

Further, at least one of the hydraulic motor and the generator is arranged in the space excluding the area between: the main shaft and the hydraulic pump; and the rear end wall surface of the wall of the nacelle. Thus, in comparison to the case where the hydraulic motor and the generator are arranged in the area between: the main shaft and the hydraulic pump; and the rear end wall surface of the wall of the nacelle, it is possible to reduce the length of the nacelle, hence reducing the nacelle in size and weight.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

(First Embodiment)

Figure 1:
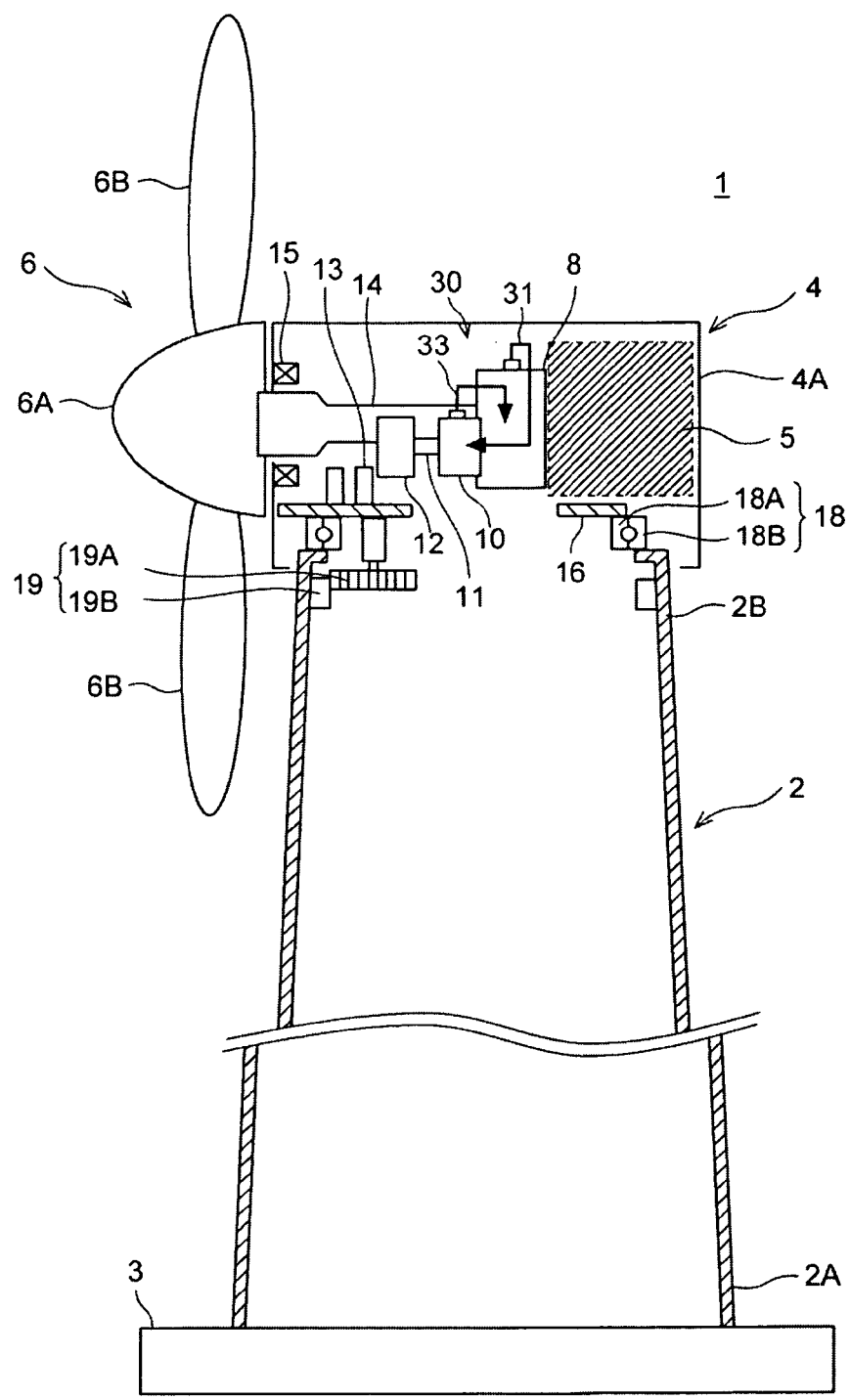
FIG. 1 is a schematic view of an overall structure of a wind turbine generator regarding a first embodiment of the present invention.
Figure 2A:
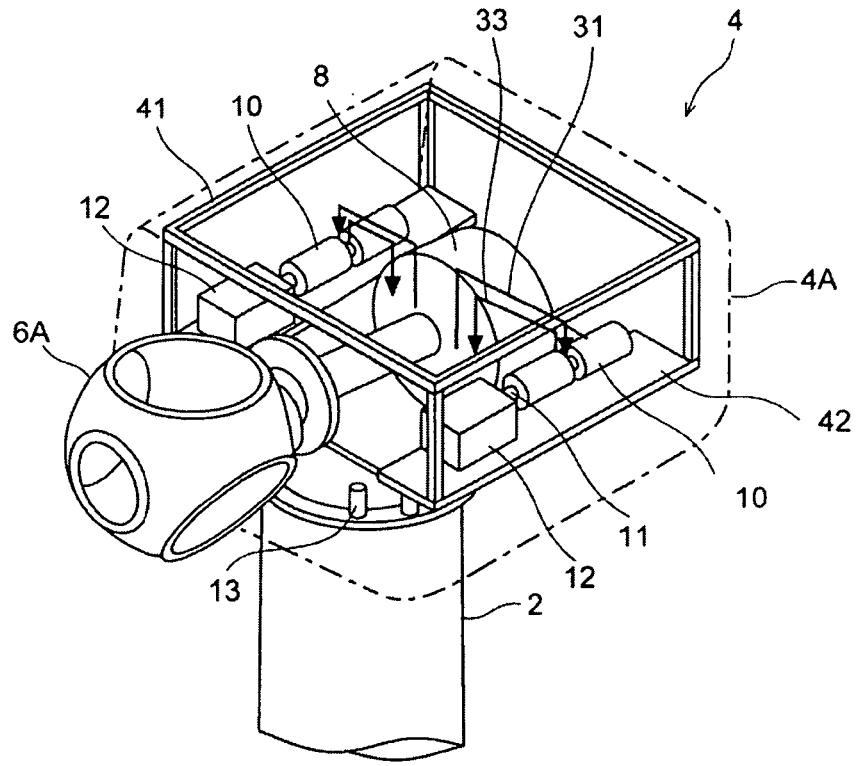
FIG. 2A is an oblique perspective view of a particular configuration example of the wind turbine generator of FIG. 1.
Figure 2B:
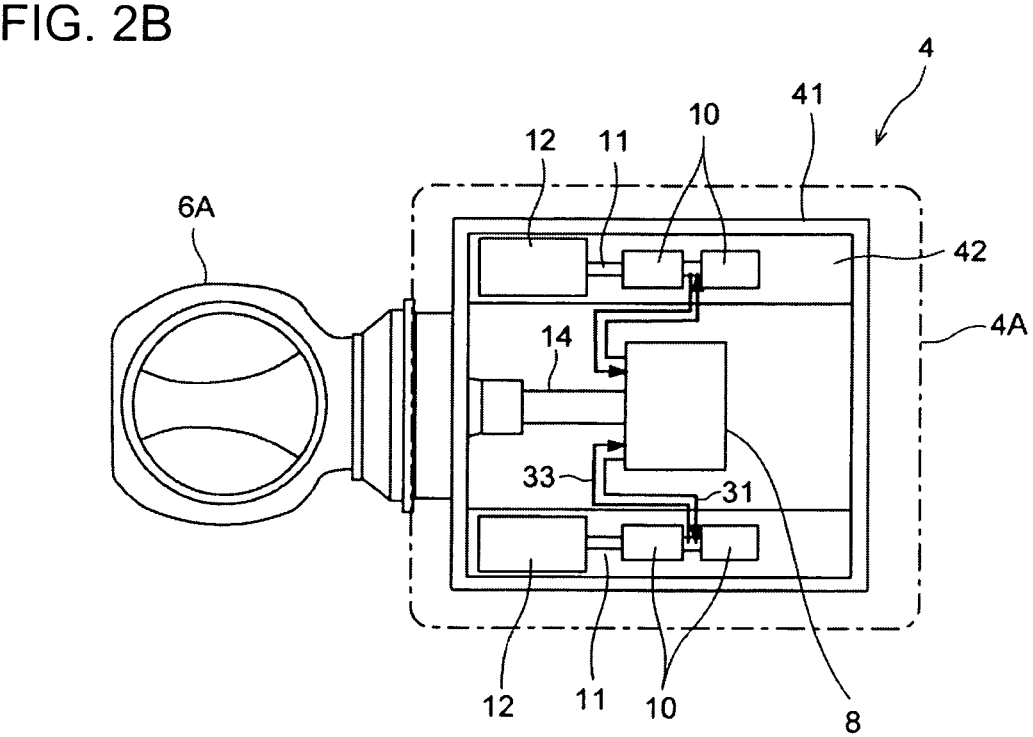
FIG. 2B is a plain view of the particular configuration example of the wind turbine generator of FIG. 1.

In a first embodiment, a wind turbine generator is explained as one type of the power generating apparatus of renewable energy type. FIG. 1 is a schematic view of an overall structure of a wind turbine generator regarding the first embodiment of the present invention. FIG. 2A is an oblique perspective view of a particular configuration example of the wind turbine generator of FIG. 1. FIG. 2B is a plain view of the particular configuration example of the wind turbine generator of FIG. 1.

Figure 2C:
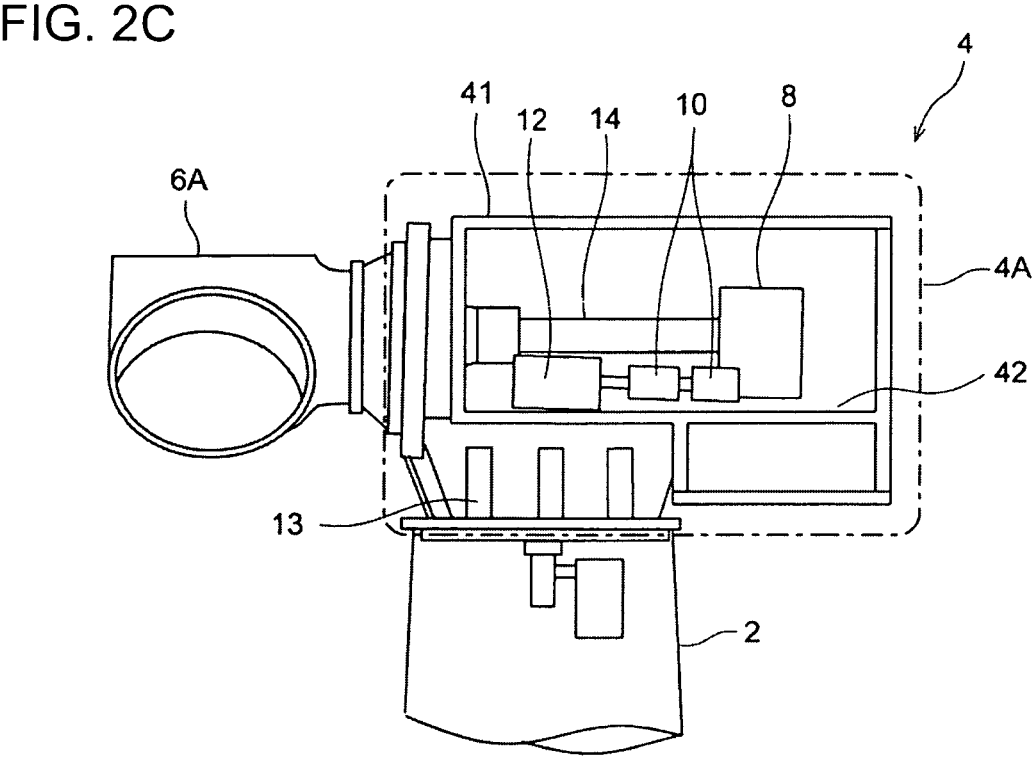
FIG. 2C is a side view of the particular configuration example of the wind turbine generator of FIG. 1.

FIG. 2C is a side view of the particular configuration example of the wind turbine generator of FIG. 1.

As shown in FIG. 1 and FIG. 2A through FIG. 2C, the wind turbine generator 1 mainly includes a tower 2, a nacelle mounted on an top part 2B of the tower 2, a rotor 6 rotated by wind, a hydraulic pump 8, a hydraulic motor 10 and a generator 12 coupled to the hydraulic motor 10.

The tower 2 is installed upright on a base 3 on the ground or offshore. The tower 2 extends vertically from a base part 2A on the base side to the top end part 2B. On the top end part 2B of the tower 2, the nacelle is mounted.

The nacelle 4 includes a nacelle base plate 16. The nacelle base plate 16 is supported rotatably by the top end part 2B of the tower via a nacelle bearing 18. More specifically, the nacelle base plate 16 is fixed to an inner ring 18A of the nacelle bearing 18 and the top end part 2B of the tower 2 is fixed to an outer ring 18B of the nacelle bearing 18.

Further, a nacelle turning mechanism 19 is attached to the nacelle base plate 16 and a yaw drive unit 13 is arranged on the nacelle base plate 16. By means of the nacelle turning mechanism 19 and the yaw drive unit 13, the nacelle base plate 16 is rotated with respect to the top end part 2B of the tower 2.

The nacelle turning mechanism 19 may be formed, for instance, by a gear 19B which meshes with an internal gear 19B formed on an inner periphery of the top end part 2B of the tower.

The yaw drive unit 13 may be formed, for instance, by a reducer which is directly coupled to a shaft of the gear 19A or connected to the gear 19A via a pinion, a clutch, a yaw motor, an electromagnetic brake, and a housing which houses these components. Further, a plurality of the yaw drive units 13 may be provided circumferentially around an axis line of the tower 2. With the above structure, when the electromagnetic brake is turned ON in such a state that the clutch is engaged, the drive force of the yaw motor is transmitted to the gear 19A via the reducer and the gear 19A rotates while meshing with the internal gear 19B. By this, the nacelle 4 turns in a yaw direction with respect to the tower 2.

The nacelle 4 houses a main shaft 14 and a hydraulic pump 8 connected to the main shaft 14. The main shaft 14 is supported rotatably by the nacelle 4 via a main shaft bearing 15.

The rotor 6 is formed by a hub 6A and a plurality of blades 6B extending radially from the hub 6A. The hub 6A of the rotor 6 is coupled to the main shaft 14. This allows the main shaft 14 to rotate with the hub 6A when the rotor 6 rotates upon receiving the wind. The rotation of the main shaft 14 is inputted to the hydraulic pump 8, thereby generating high pressure operating oil (high pressure oil) in the hydraulic pump 8.

The hydraulic motor 10 is housed in the nacelle 4. The hydraulic motor 10 is arranged in a space excluding an area 5 between: the main shaft 14 and the hydraulic pump 8; and a rear end wall surface 4A of a wall of the nacelle 4. The rear end wall surface 4A is on a side of the nacelle 4 farther from the blade. Meanwhile, the hydraulic motor 10 may be installed on the nacelle base plate 16, or placed on a frame 41, a shelf 42, or the like arranged in the nacelle 4 (see FIG. 2A through FIG. 2C).

The hydraulic motor 10 is driven by the high pressure oil supplied from the hydraulic pump 8 in the nacelle 4.

Between the hydraulic pump 8 and the hydraulic motor 10, an operating oil piping 30 is provided. The operating oil circulates through the operating oil piping 30. The operating oil piping 30 includes a high pressure piping 31 for supplying the high pressure oil discharged from the hydraulic pump 8 to the hydraulic motor 10 and a low pressure piping 33 for supplying the low pressure operating oil (low pressure oil) discharged from the hydraulic motor 10 to the hydraulic pump 8.

The generator 12 coupled to the hydraulic motor 10 via an output shaft is housed with the hydraulic motor 10 in the nacelle 4. Further, the generator 12 is arranged in the space excluding the area 5 between: the main shaft 14 and the hydraulic pump 8; and the rear end wall surface 4A of the wall of the nacelle 4.

The hydraulic motor 10 and the generator 12 have the following relative position relationships. The hydraulic motor 10 and the generator 12 may be arranged in a horizontal direction from each other as shown in FIG. 1, in a vertical direction from each other, or in an oblique direction from each other. In the drawings, the hydraulic motor 10 and the generator 12 are arranged in the space excluding the area 5. However, the arrangement is not limited to this as long as at least one of the hydraulic motor 10 and the generator 12 is arranged in the space. More specifically, one of the hydraulic motor 10 and the generator 12 may be arranged in the area 5.

According to the above wind turbine generator 1, the hydraulic motor 10 and the generator 12 are housed in the nacelle 4. Thus, compared to the case where the hydraulic motor 10 and the generator 12 are arranged in the base part 2A of the tower 2, the operating oil piping can be reduced in length.

Further, in this wind turbine generator 1, at least one of the hydraulic motor 10 and the generator 12 is arranged in the space excluding the area 5 between: the main shaft 14 and the hydraulic pump 8; and the rear end wall surface 4A of the wall of the nacelle 4. Thus, compared to the case where the hydraulic motor 10 and the generator 12 are arranged in the area 5, the nacelle can be reduced in length (in the direction of the main shaft), hence achieving a smaller and lighter nacelle 4.

In the wind turbine generator 1, at least one of the hydraulic motor 10 and the generator 12 is arranged above the yaw drive unit 13 as shown in FIG. 2C and lateral to the hydraulic pump 8 as shown in FIG. 2B. This allows for efficient use of the space in the nacelle 4. Further, without increasing the width of the nacelle 4 (in a direction perpendicular to the main shaft 14 in a horizontal plane), at least one of the hydraulic motor 10 and the generator 12 can be arranged in the nacelle 4, thereby achieving further reduction of weight and size of the nacelle 4.

In the wind turbine generator 1, the hydraulic motor 10 and the generator 12 are housed in the nacelle 4 and are arranged in substantially horizontal direction and at least a part of the hydraulic motor 10 and the generator 12 that are coupled together via the output shaft 14, is arranged lateral to the hydraulic pump 8.

By arranging the hydraulic motor 10 and the generator 12 in the nacelle 4, it is possible to reduce the length of the piping through which the operating oil circulates. Further, the hydraulic motor 10 and the generator 12 are arranged in the substantially horizontal direction and at least a part of the hydraulic motor 10 and the generator 12 that are coupled together via the output shaft 11, is disposed lateral to the hydraulic pump 8. Thus, it is possible to use the space in the nacelle 4 efficiently, thereby achieving further downsizing and weight-reduction of the nacelle 4.

(Second Embodiment)

Figure 3:
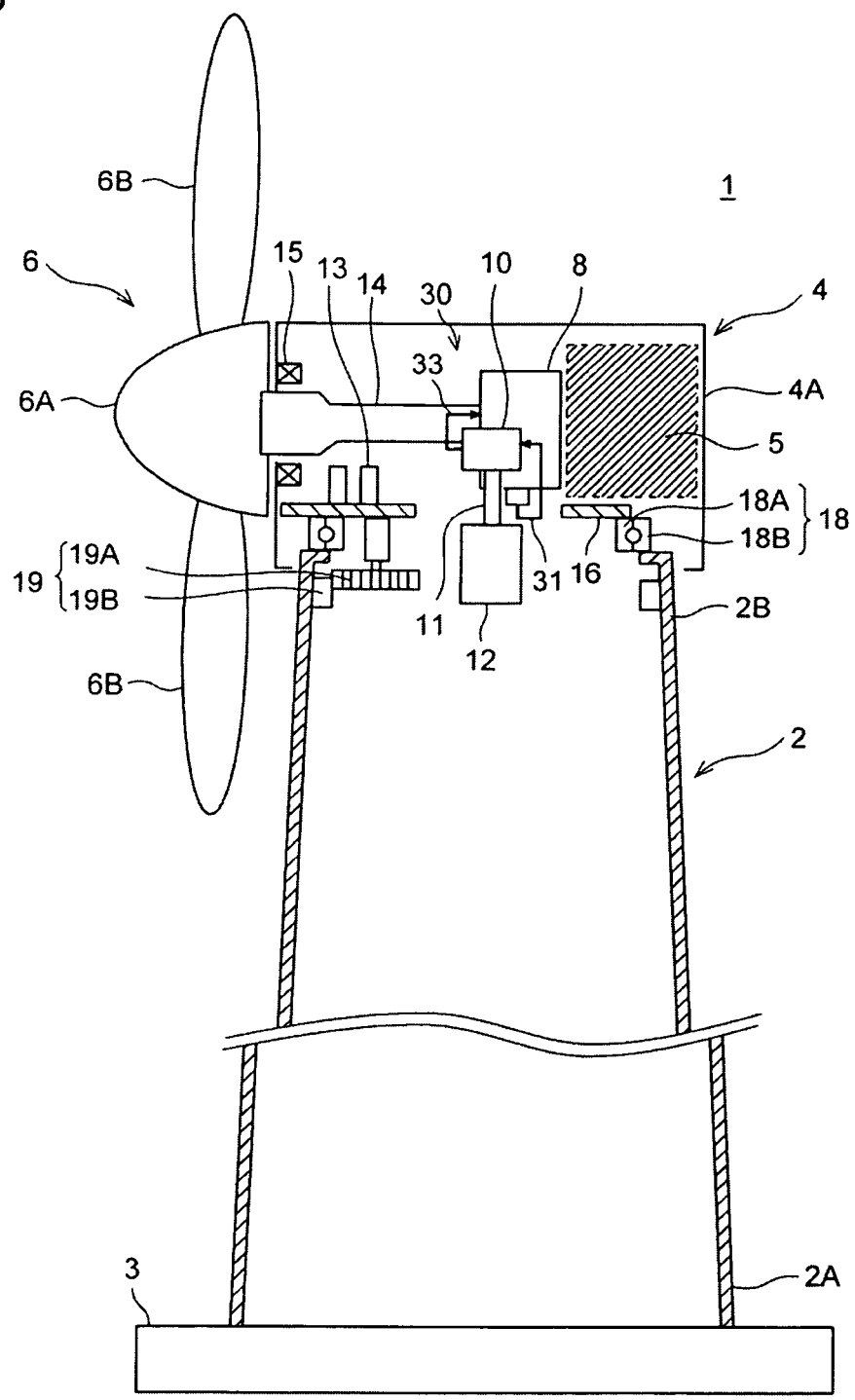
FIG. 3 is a schematic view of an overall structure of a wind turbine generator regarding a second embodiment of the present invention.
Figure 4A:
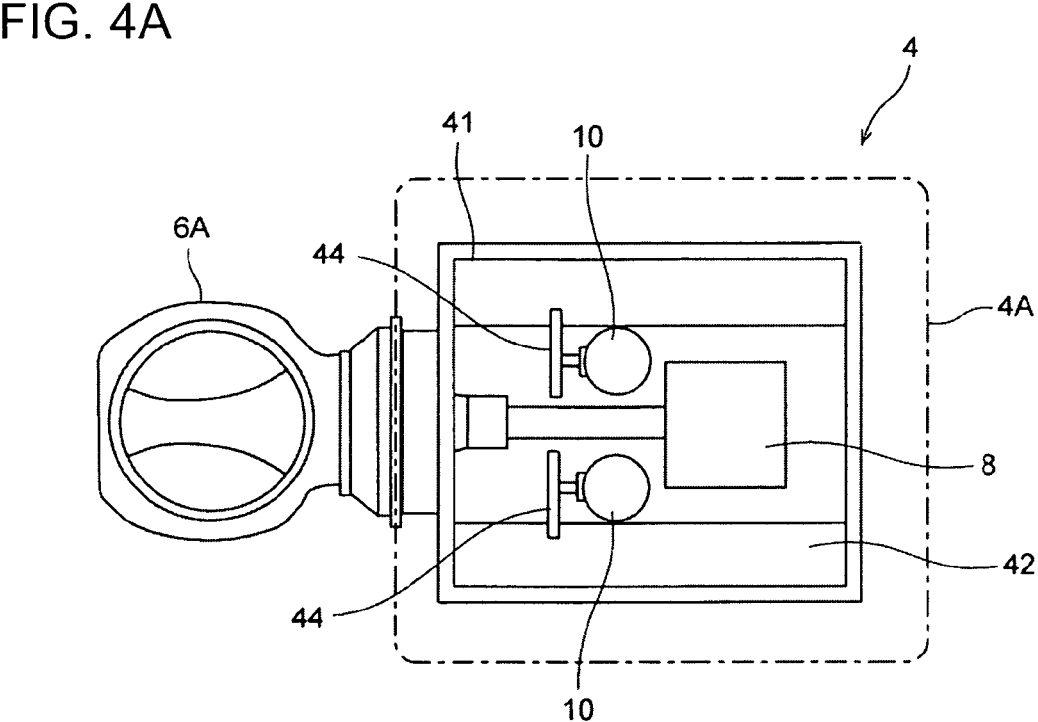
FIG. 4A is a plain view of a particular configuration example of the wind turbine generator of FIG. 3.
Figure 4B:
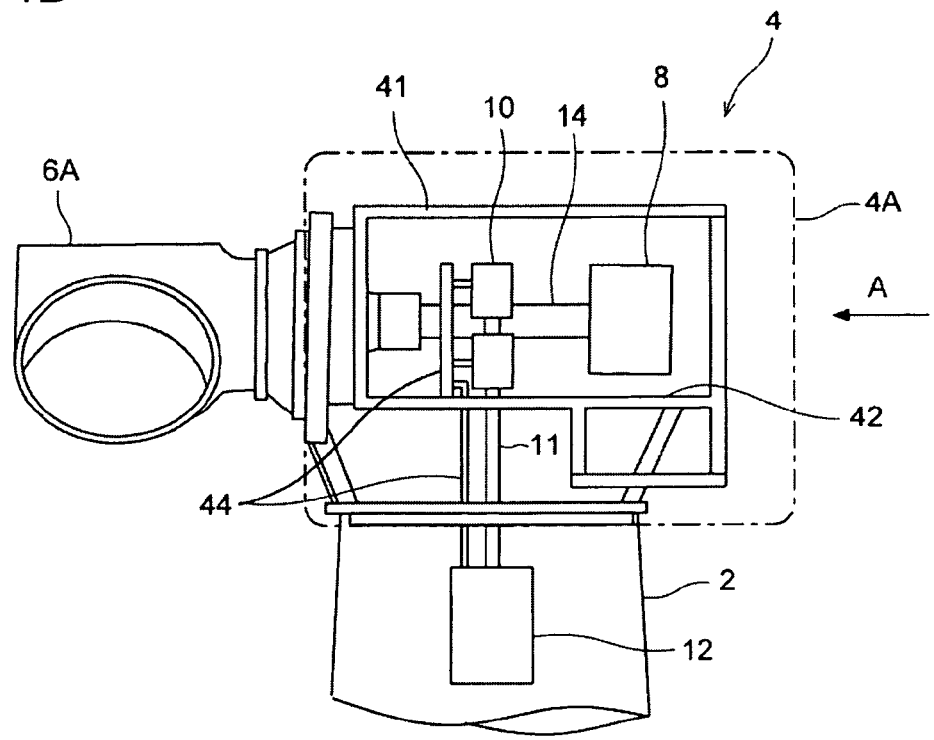
FIG. 4B is a side view of the particular configuration example of the wind turbine generator of FIG. 3.
Figure 4C:
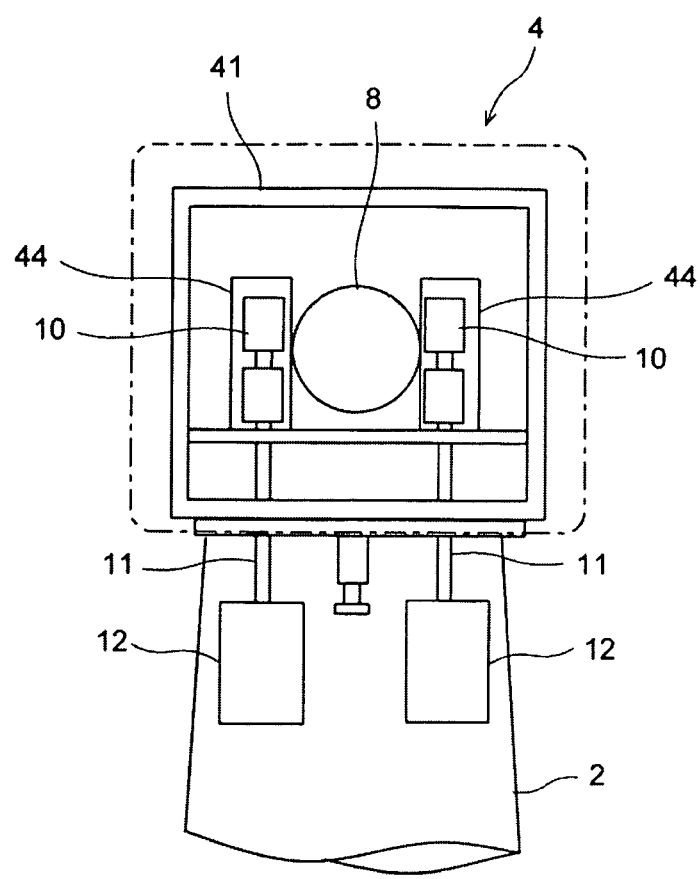
FIG. 4C is a view taken in a direction of an arrow A of FIG. 4B.

Next, a second embodiment of the present invention is explained in reference to FIG. 3 and FIG. 4A through FIG. 4C. FIG. 3 is a schematic view of an overall structure of a wind turbine generator regarding the second embodiment of the present invention. FIG. 4A is a plain view of a particular configuration example of the wind turbine generator of FIG. 3. FIG. 4B is a side view of the particular configuration example of the wind turbine generator of FIG. 3. FIG. 4C is a view taken in a direction of an arrow A of FIG. 4B. The wind turbine generator regarding the second embodiment has substantially the same configuration as the wind turbine generator 1 regarding the first embodiment except for configurations of the hydraulic transmission and the operating oil piping 30. In the following embodiments, components already described above are denoted by the same reference numerals in FIG. 3 and FIG. 4A through FIG. 4C, and thus detailed description thereof will be hereinafter omitted and the components and configurations different from the first embodiment are mainly explained here.

The wind turbine generator 1 regarding the second embodiment is configured such that the hydraulic motor 10 and the generator 12 are supported on the nacelle side by a support member 44 and the hydraulic motor 10 is disposed in the nacelle 4 and the generator 12 is disposed in an upper part of the tower 2. For instance, the support member 44 is fixed to a frame 41 in the nacelle 4 (see FIG. 4A through FIG. 4C) and the hydraulic motor 10 and the generator 12 are supported by the support member 44. The hydraulic motor 10 and the generator 12 may be supported by any fixing members in the nacelle 4, or may be directly supported by the frame 41, by the nacelle base plate 16 or by the shelf 42 arranged on the base plate 16. Further, any of the fixing members in the nacelle 4 may function as the support member.

In such case, the hydraulic motor 10 is connected to the hydraulic pump 8 by the operating oil piping 30 so that the hydraulic motor 10 is immovable relative to the hydraulic pump 8 in the yaw direction. The hydraulic motor 10 and the generator 12 are coupled via the output shaft 11 and thus, by fixing one of the hydraulic motor 10 and the generator 12 to the tower 2 by the support member 44, the other of the hydraulic motor 10 and the generator 12 to the nacelle 4 by the support member 44, the other of the hydraulic motor 10 and the generator 12 can be supported by nacelle 4. However, this is not limitative as long as at least a part of the hydraulic motor 10 and the generator 12 is arranged in the upper part of the tower 2. The hydraulic motor 10 alone or both the hydraulic motor 10 and the generator 12 may be arranged in the upper part of the tower 2. Further, the upper part of the tower 2 is a part of the tower 2 between the base part 2A and the top end part 2B and above a midpoint between the base part 2A and the top end part 2B.

In this manner, the hydraulic motor 10 and the generator 12 are supported on the nacelle side by the support member 44 and at least a part of the hydraulic motor 10 and the generator 12 that are coupled together via the output shaft 11, is arranged in the upper part of the tower 2. In comparison to the case where the hydraulic motor 10 and the generator 12 are arranged in the base part of the tower 2, the operating oil piping can be reduced in length. Further, at least a part of the hydraulic motor 10 and the generator 12 is arranged on the tower side, thereby achieving further reduction of the nacelle 4 in size and weight.

In the wind turbine generator 1, the hydraulic motor 10 and the generator 12 are housed in the nacelle 4. The hydraulic motor 10 and the generator 12 are arranged such that the output shaft 11 is arranged vertically.

By arranging the hydraulic motor 10 in the nacelle 4, the hydraulic motor 10 can be positioned closer to the hydraulic pump 8, hence reducing the length of the operating oil piping 30. In contrast, the generator 12 is arranged at least partially in the upper part of the tower 2. In such case, by positioning the hydraulic motor 10 and the generator 12 in the vertical direction, the hydraulic motor 10 and the generator 12 can be easily arranged without increasing the diameter of the tower 2.

Further, In this wind turbine generator 1, the hydraulic motor 10 may be supported on the nacelle side by the support member 44 and positioned in the upper space of the tower 2.

By arranging the hydraulic motor 10 in the upper space of the tower 2, it is possible to further reduce the nacelle 4 in size and weight. In such case, with the hydraulic motor 10 supported on the nacelle side by the support member 44, the hydraulic motor 10 and the piping 30 connecting the hydraulic pump 8 and the hydraulic motor 10 can rotate together during turning of the nacelle 4.

(Third Embodiment)

Figure 5:
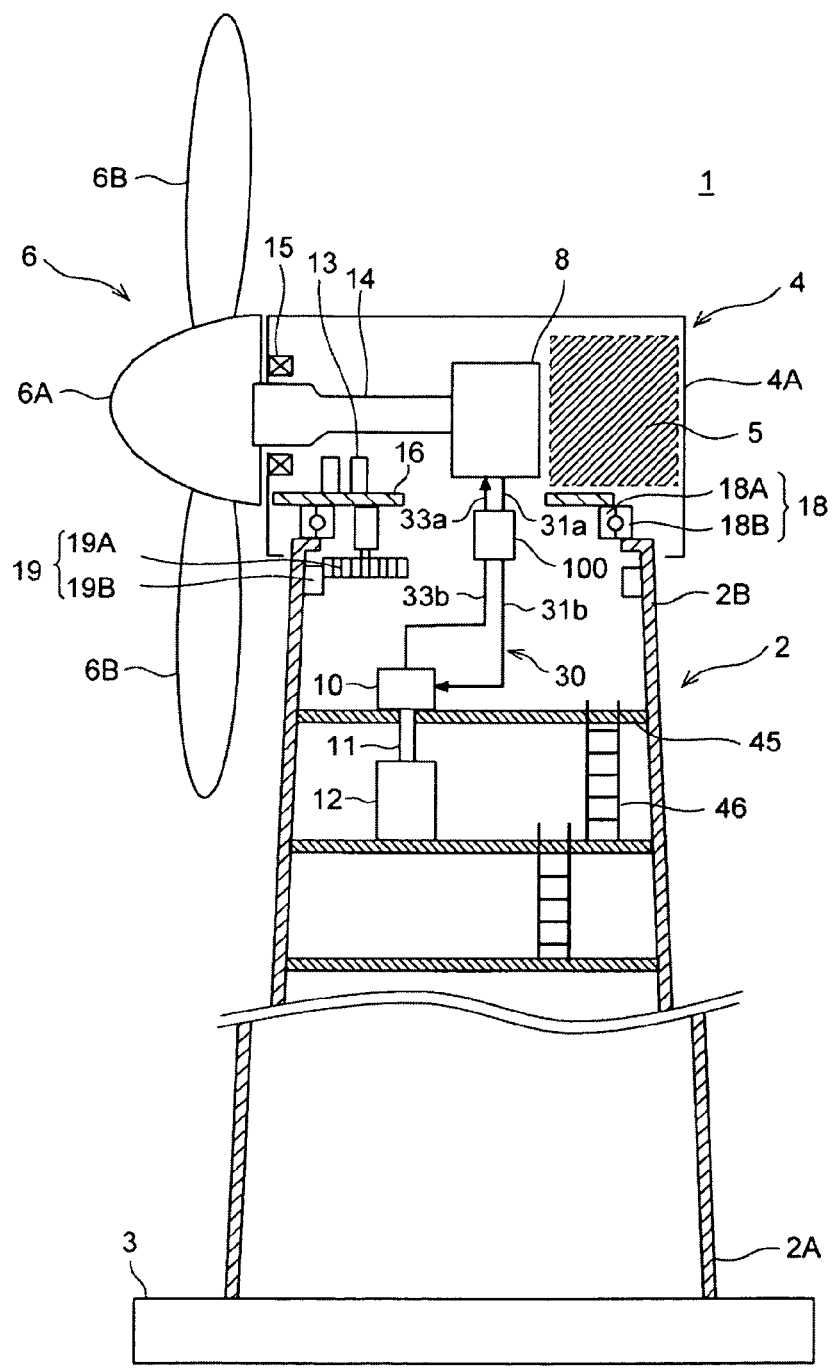
FIG. 5 is a schematic view of an overall structure of a wind turbine generator regarding a third embodiment of the present invention.
Figure 6A:
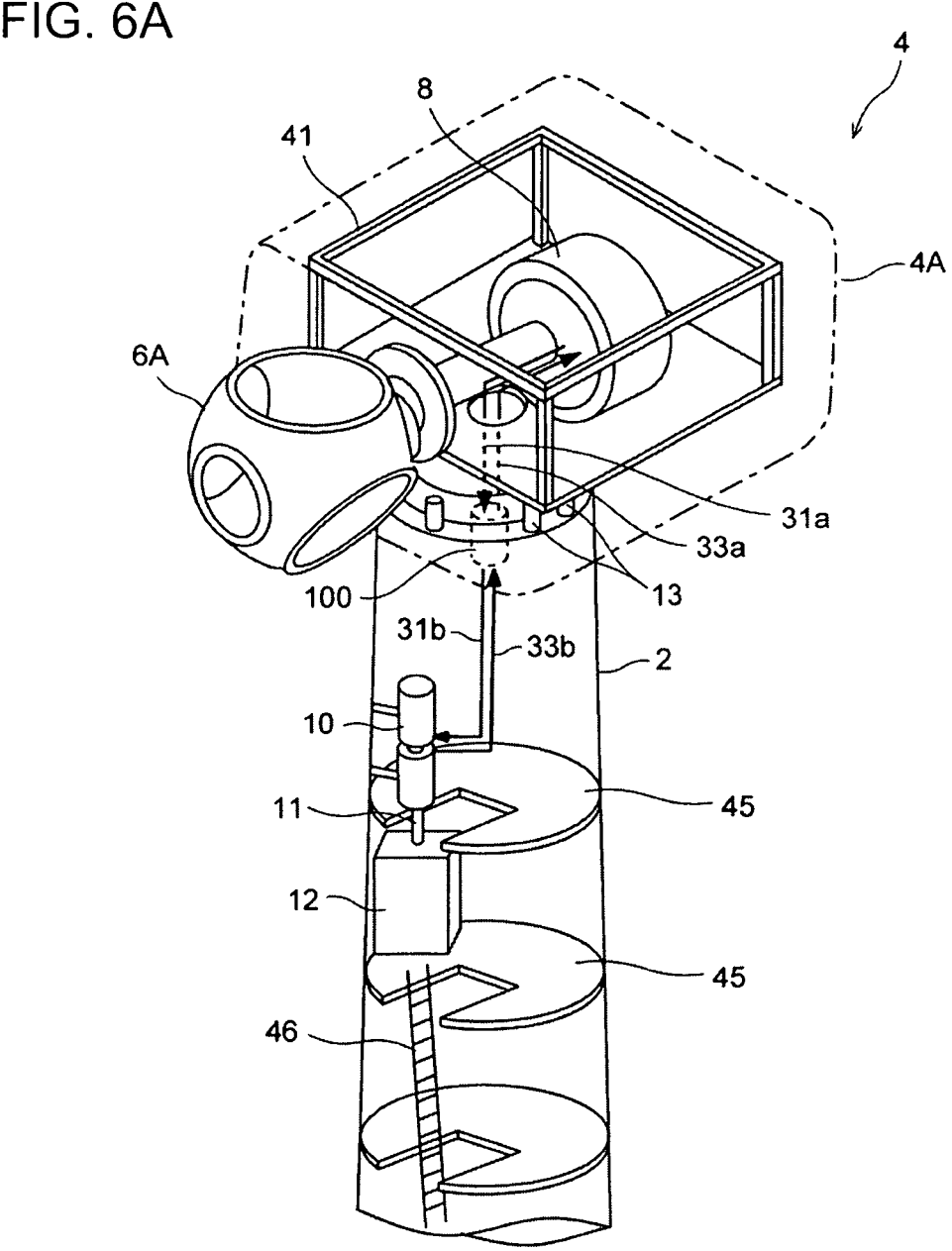
FIG. 6A is an oblique perspective view of a particular configuration example of the wind turbine generator of FIG. 5.
Figure 6B:
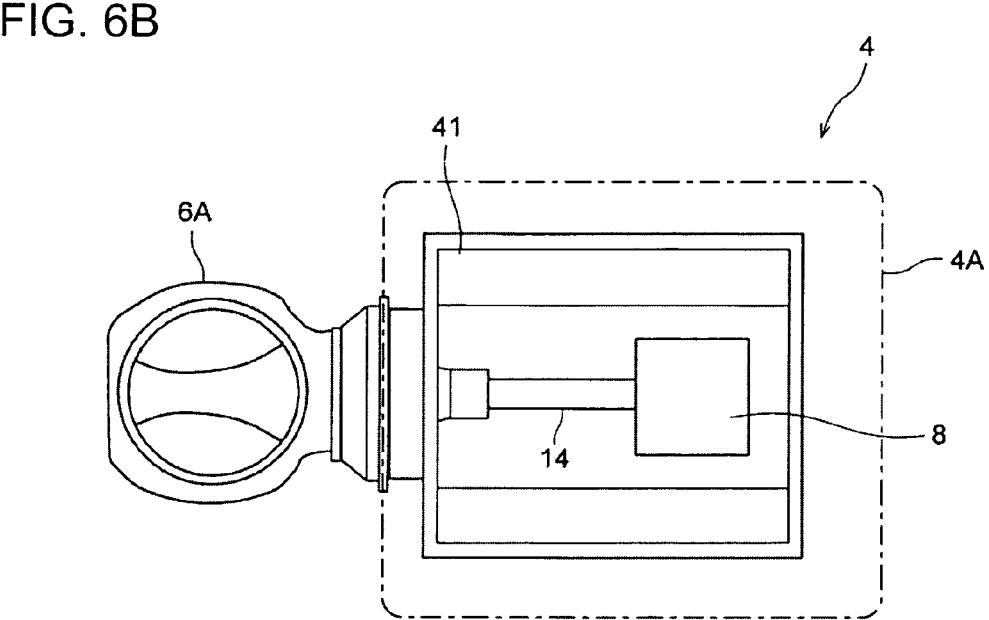
FIG. 6B is a plain view of the particular configuration example of the wind turbine generator of FIG. 5.
Figure 6C:
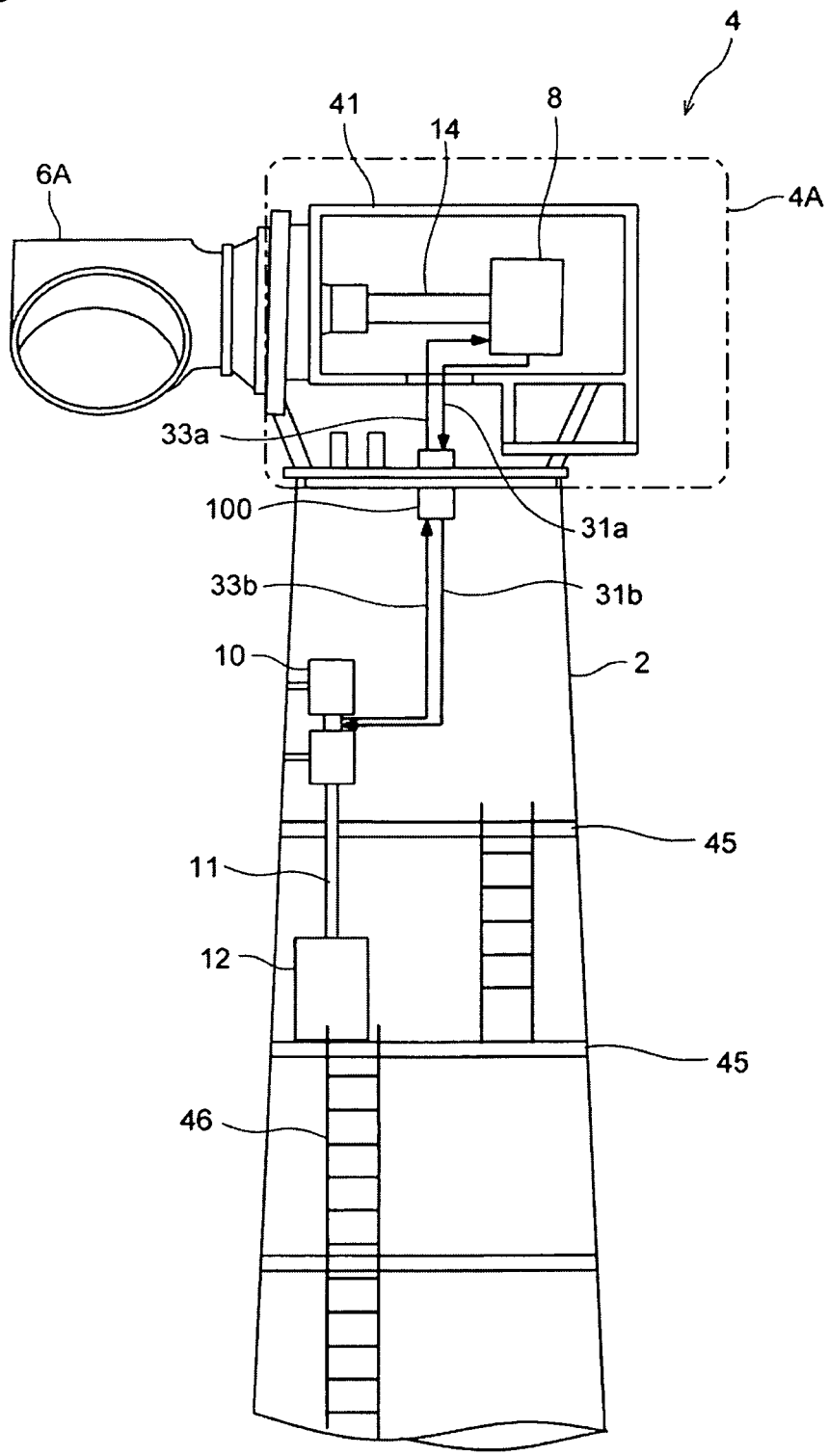
FIG. 6C is a side view of the particular configuration example of the wind turbine generator of FIG. 5.

A wind turbine generator regarding a third embodiment of the present invention is explained in reference to FIG. 5 and FIG. 6A through FIG. 6C. FIG. 5 is a schematic view of an overall structure of a wind turbine generator regarding the third embodiment of the present invention. FIG. 6A is an oblique perspective view of a particular configuration example of the wind turbine generator of FIG. 5. FIG. 6B is a plain view of the particular configuration example of the wind turbine generator of FIG. 5. FIG. 6C is a side view of the particular configuration example of the wind turbine generator of FIG. 5. The wind turbine generator 1 regarding the third embodiment has substantially the same configuration as the wind turbine generator 1 regarding the first embodiment except for configurations of the hydraulic transmission and the operating oil piping 30. In the following embodiments, components already described above are denoted by the same reference numerals in FIG. 5 and FIG. 6A through FIG. 6C, and thus detailed description thereof will be hereinafter omitted and the components and configurations different from the first embodiment are mainly explained here.

The wind turbine generator 1 regarding the third embodiment is configured such that the hydraulic motor 10 and the generator 12 are supported on the tower side and positioned in the upper part of the tower 2.

In the tower 2, a plurality of floors 45 fixed to a wall of the tower 2 are arranged in the vertical direction. The floors 45 are connected by a ladder 46 to allow operators to move up and down.

The hydraulic motor 10 and the generator 12 are installed on the floors 45 respectively. In such case, the hydraulic motor 10 and the generator 12 have the following relative-position relationships. The hydraulic motor 10 and the generator 12 may be arranged in the horizontal direction, in the vertical direction as shown in the drawings, or in the oblique direction from each other. In the drawings, the hydraulic motor 10 and the generator 12 are arranged on the floors 45. However, a means for fixing the hydraulic motor 10 and the generator 12 to the tower side is not limited to this. The hydraulic motor 10 and the generator 12 may be supported by any fixing members in the tower 2 or by the wall of the tower 2. Further, any of the fixing members in the tower 2 may function as the support member.

The hydraulic pump 8 and the hydraulic motor 10 are connected by the operating oil piping 30 through which the operating oil flows.

The operating oil piping 30 includes the high pressure piping 31 (31a, 31b) for supplying the high pressure oil discharged from the hydraulic pump 8 to the hydraulic motor 10 and the low pressure piping 33 (33a, 33b) for supplying the low pressure oil discharged from the hydraulic motor 10 to the hydraulic pump 8.

The high pressure piping 31 is formed by a first high pressure piping 31a supported on the nacelle side and a second high pressure piping 31b supported on the tower side. Between the first and second high pressure pipings 31a, 31b, a connection part 100 having the swivel structure is interposed. By means of the connection part 100, the first and second high pressure pipings 31a, 31b are connected so as to be relatively rotatable.

The low pressure piping is formed by a first low pressure piping 33a supported on the nacelle side and a second low pressure piping 33b supported on the tower side. Between the first and second low pressure pipings 33a, 33b, the connection part 100 is interposed. By means of the connection part 100, the first and second low pressure pipings 33a, 33b are connected so as to be relatively rotatable.

The connection part 100 having the swivel structure is arranged in a rotation center of the nacelle 4. The connection part 100 is described later in details.

The hydraulic pump 8 is driven by the main shaft 14 to generate the high pressure oil. The high pressure oil is supplied to the hydraulic motor 10 via the high pressure piping 31 to drive the hydraulic motor 10. Meanwhile, the generator 12 coupled to the hydraulic motor 10 is driven to generate electric power. The low pressure oil discharged from the hydraulic motor 10 is then supplied to the hydraulic pump 8 via the low pressure piping 33 and the pressure of the low pressure oil is raised in the hydraulic pump 8 and then the generated high pressure oil is supplied to the hydraulic motor 10.

As described above, by supporting the hydraulic motor 10 and the generator 12 on the tower side, it is possible to fix at least one of the hydraulic motor 10 and the generator 12 to the tower 2 in a stable manner. Further, the pipings 31a, 33a connected to the hydraulic pump 8 supported on the nacelle side 4 are connected relatively rotatable to the pipings 31b, 33b connected to the hydraulic motor 10 supported on the tower side. By this, the piping structure can be appropriately maintained even when the nacelle 4 turns in the yaw direction.

In the above configuration, the hydraulic motor 10 and the generator 12 may be arranged in substantially vertical direction. By this, the hydraulic motor 10 and the generator 12 can be easily arranged without increasing the diameter of the tower 2.

Further, in the above configuration, the hydraulic motor 10 may be connected to the generator 12 via a flexible joint. By this, it is possible to enhance a degree of freedom in the relative-position relationship between the hydraulic motor 10 and the generator 12, and also to adjust the positions of the hydraulic motor 10 and the generator 12 easily.

Figure 7:
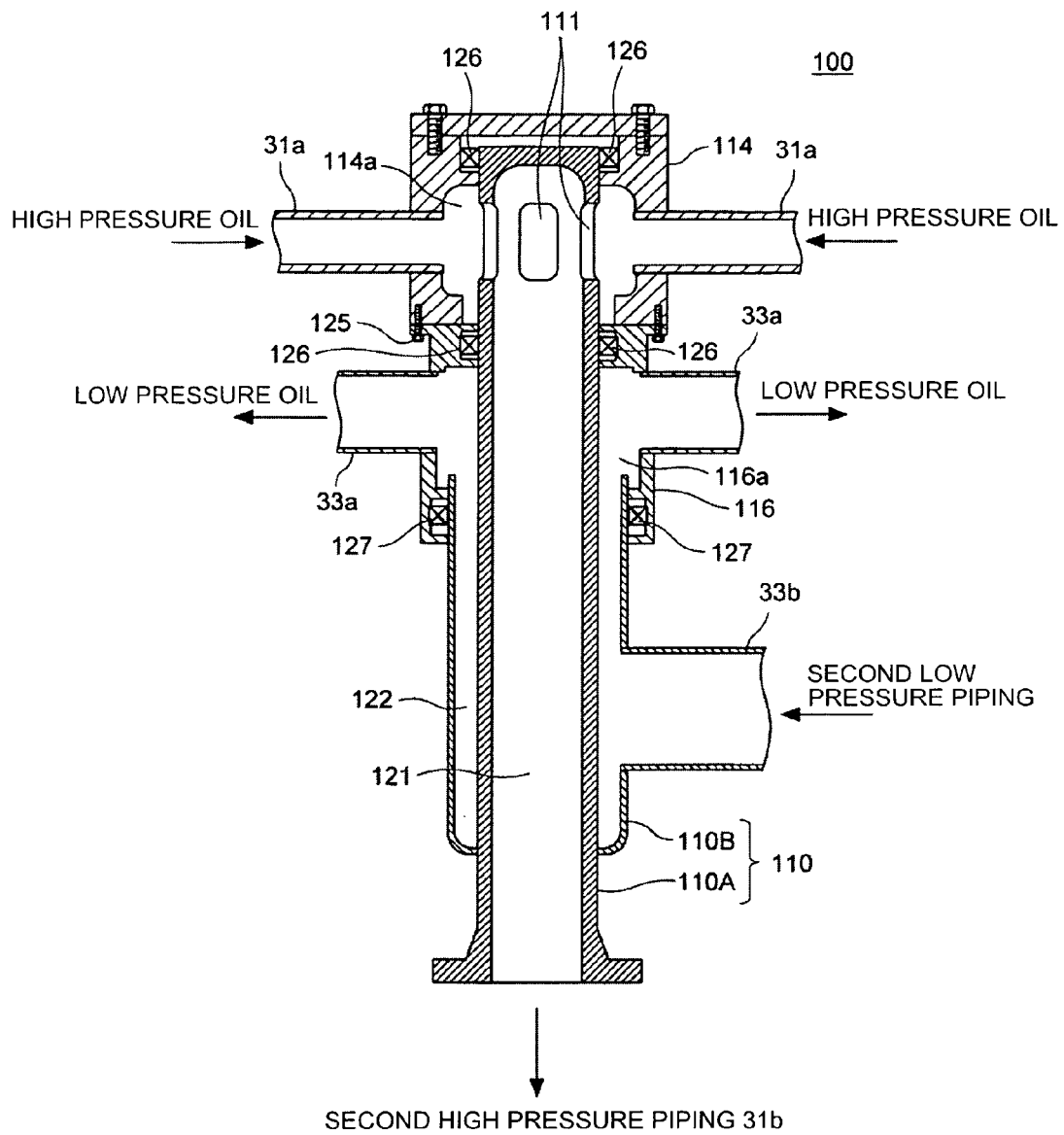
FIG. 7 illustrates a first configuration example of a swivel structure applied to the wind turbine generator regarding the embodiments of the present invention.
Figure 8:
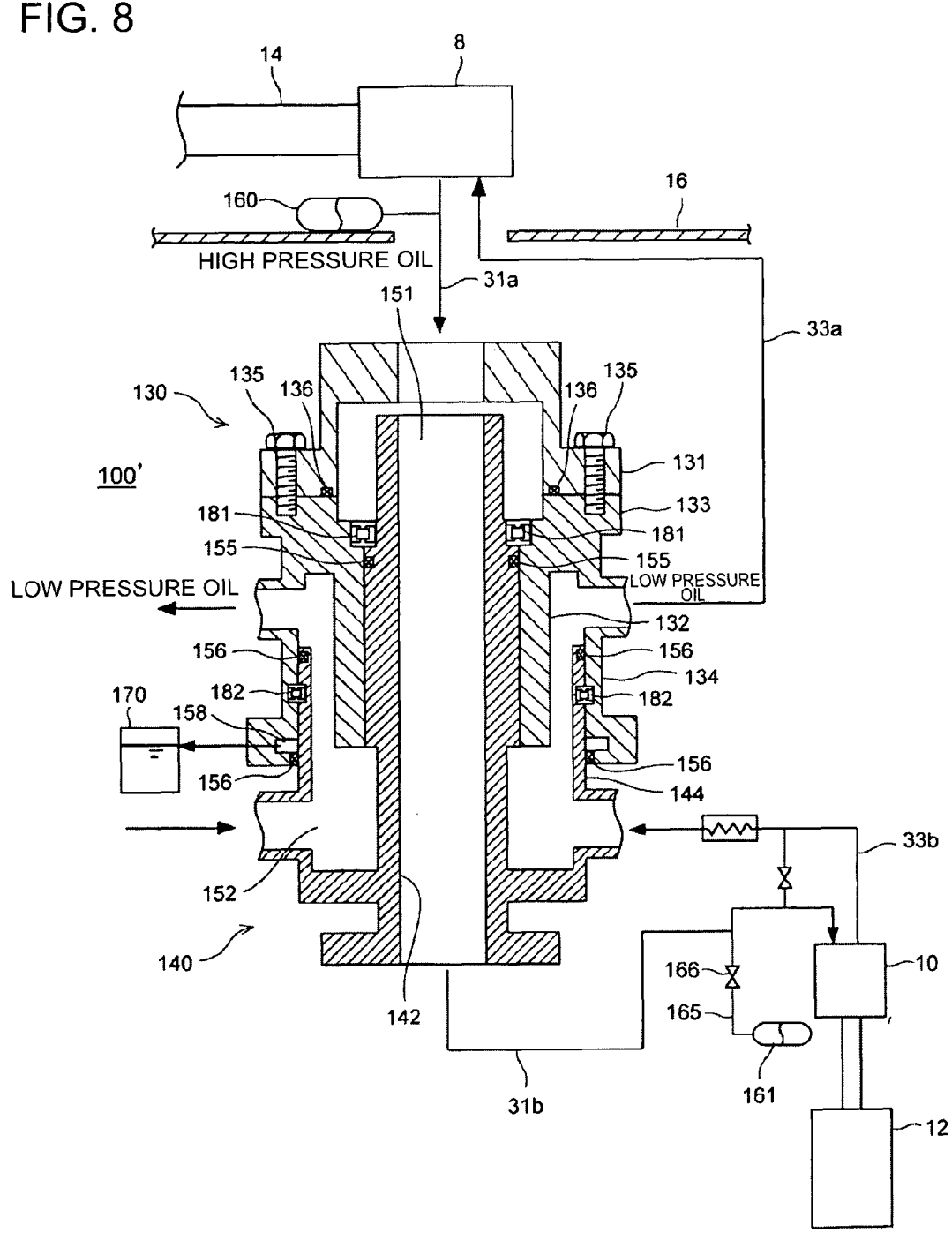
FIG. 8 illustrates a second configuration example of a swivel structure applied to the wind turbine generator regarding the embodiments of the present invention.

In reference to FIG. 7 and FIG. 8, particular configuration examples of the connection part 10 are described.

FIG. 7 illustrates a first configuration example of the swivel structure applied to the wind turbine generator regarding the embodiments of the present invention.

The connection part 100 of the swivel structure in the first configuration example, includes a double tube 110 extending in the axial direction of the tower 2 and first and second jackets 114, 116 which are arranged to surround the double tube 110. By the double tube 110 and the first and second jackets 114, 116, a first flow path 121 and a second flow path 122 are formed. In the first flow path 121, the high pressure oil flows from the hydraulic pump 8 arranged on the nacelle side to the hydraulic motor 10 arranged on the tower side. In the second flow path 122, the low pressure oil flows from the hydraulic motor 10 to the hydraulic pump 8.

The double tube 110 is constituted by an inner tube 110A and an outer tube 110B. An inner flow path is formed inside the inner tube 110A and an outer flow path is formed by the inner tube 110A and the outer tube 110B.

The first jacket 114 is provided on an outer circumferential side of the inner tube 110A. An annular flow path 114a is formed by an inner wall surface of the first jacket 114 and an outer wall surface of the inner tube 110A. The annular flow path 114a is in communication with the first high pressure piping 31a which is connected to the outer periphery of the first jacket 114. The annular flow path 114a is in communication with the inner flow path via a first communication opening 111 formed in the inner tube 110A. Further, the inner flow path is in communication with the second high pressure piping 31B connected to an end of the inner tube 110A. And, the annular flow path 114a and the inner flow path form the first flow path 121. The high pressure oil is supplied from the first high pressure piping 31a to the first flow path 121 through the annular flow path 114a, the first communication opening and the inner flow path and then discharged to the second high pressure piping 31b.

The second jacket 116 is provided on the outer circumferential side of the outer piping 110B and is arranged closer to the tower side than the first jacket 114. The second jacket 116 is fastened to the first jacket by bolts 125. The outer flow path is in communication with the second low pressure piping 33b connected to the outer periphery of the outer piping 110B and also in communication with an annular flow path 116a formed between the inner wall surface of the second jacket 116 and the outer wall surface of the inner piping 110A. The annular flow path 116a is in communication with the first low pressure piping 33a connected to the outer periphery of the second jacket 116. And the outer flow path and the annular flow path 116a form the second flow path 122. The low pressure oil supplied from the second low pressure piping 33b to the second flow path 122, is discharged through the outer flow path and the annular flow path 116a to the first low pressure piping 33a.

The first jacket 114 and the second jacket 116 are supported on the nacelle side. In contrast, the double tube 110 is supported on the tower side. Between the first jacket 114 and the inner tube 110A of the double tube 110, an inner seal 126 is provided to secure liquid-tightness therebetween. Between the second jacket 116 and the outer tube 110B of the double tube 110, an outer seal 127 is provided to secure liquid-tightness therebetween. The liquid-tightness is maintained by means of the inner seal 126 and the outer seal 127. The first jacket 114 and the second jacket 116 are attached to be rotatable relative to the double tube 110. Between the first jacket 114 or the second jacket 116 and the double tube 110, a bearing may be provided to improve slidability.

With the above structure, it is possible to allow for the relative rotation between the first piping (the first high pressure piping 31a and the first low pressure piping 33a) and the second piping (the second high pressure piping 31b and the second low pressure piping 33b) while maintaining the flow of the high pressure oil streaming from the hydraulic pump 8 on the nacelle side to the hydraulic motor 10 on the tower side and the flow of the low pressure oil from the hydraulic pump 8 to the hydraulic motor 10. Therefore, the high pressure oil and the low pressure oil can smoothly communicate between the hydraulic pump 8 in the nacelle 4 and the hydraulic motor 10 in the tower 2 via the connection part 100 even when the nacelle 4 turns.

In the above first configuration example, a cable extending between the nacelle 4 to the tower 2 may be housed in at least one of the first flow path and the second flow path. The cable, herein, may be a power cable for supplying power to electric devices such as the hydraulic pump 8 arranged in the nacelle 4 or a signal cable for controlling the electric devices, a signal cable connected to each measuring device attached to the nacelle side 4, or a lightning protection cable for grounding in the event of lightning striking the blade 6B or the nacelle 4.

By placing the cable in at least one of the first and second flow paths, the cable is protected from damages even when the nacelle 4 turns.

FIG. 8 illustrates a second configuration example of a swivel structure applied to the wind turbine generator regarding the embodiments of the present invention.

In the second configuration example, a connection part 100' of the swivel structure connects the hydraulic pump 8 housed in the nacelle 4 to the hydraulic motor 10 arranged in the tower 2 using a first double tube 130 and a second double tube 140.

The first double tube 130 is fixed to the nacelle 4 and the second double tube 140 is fixed to the tower 2. The first double tube 130 and the second double tube 140 are joined together such as to be relatively rotatable. Configurations of the first double tube 130 and the second double tube 140 are described below in details.

The first double tube 130 is formed by an upper part 131 and a lower part 133 that are joined together by bolts 135 at flange portions. Further, a seal 136 is provided in a connection plane between the upper part 131 and the lower part 133 to maintain liquid-tightness therebetween. The upper part 131 includes a high-pressure oil inlet on top. The high-pressure oil inlet is connected to a discharge side of the hydraulic pump 8 via the first high pressure piping 31a. The lower part 133 includes an inner cylindrical portion and an outer cylindrical portion that extend downward from the flange portion joined to the upper part 131. On a side surface of the outer cylindrical portion, a low-pressure oil outlet is formed. The low-pressure oil outlet is connected to an intake side of the hydraulic pump 8 via the first low pressure piping 33a.

A first inner tube 132 of the first double tube 130 is formed by the upper part 131 and a portion of the lower part (the inner cylindrical portion). A first outer tube 134 of the first double tube 130 is formed by a portion of the lower part (the outer cylindrical portion).

In contrast, The second double tube 140 includes a second inner tube 142 and a second outer tube 142 provided on the outer circumferential side of the second inner tube 142. The second double tube 140 includes a high-pressure oil outlet at the bottom. The high-pressure oil outlet is connected to the second high pressure piping 31b. On a side surface of the second double tube 140, a low-pressure oil inlet is formed. The low-pressure oil inlet is connected to the second low pressure piping 33b.

The first double tube 130 and the second double tube 140 are rotatably fitted. By the first and second double tubes 130, 140 fitted in the above manner, an inner flow path 151 where the high pressure oil flows from the nacelle side to the tower side and an outer flow path 152 where the low pressure oil flows from the tower side to the nacelle side.

By rotatably connecting the first double tube 130 supported on the nacelle side and the second double tube 140, it is possible to maintain the flow of the operating oil between the nacelle 4 and the tower 2 and also to allow the relative rotation between the pipings 31a, 33a on the nacelle side and the pipings 31b, 33b on the tower side. Further, an inner flow path 151 is formed by the first inner tube 132 and the second inner tube 142 and an outer flow path 152 is formed by the first outer tube 134 and the second outer tube 144. The low pressure oil flows in the outer flow path 152 and the high pressure oil flows in the inner flow path 151. Therefore, it is possible to secure the flow of the operating oil flowing from the hydraulic pump 8 toward the hydraulic motor 10 and the flow of the operating oil flowing from the hydraulic motor 10 toward the hydraulic pump 8. Alternatively, in the above configuration, the high pressure oil may flow in the outer flow path 152 while the low pressure oil flows in the inner flow path 151.

Further, a bearing may be provided to support the first and second double tubes 130, 140 rotatably and to receive at least one of a thrust load and a radial load along the longitudinal direction and a radial direction, respectively, of the first and second double tubes 130, 140. For instance, an inner bearing 181 may be provided between the inner wall surface of the first inner tube 132 and the outer wall surface of the second inner tube. Further, an outer bearing 182 may be provided between the inner wall surface of the first outer tube 134 and the second outer tube 144.

By rotatably supporting the first double tube 130 to the second double tube 140 using the bearings 181, 182, a rotation of the first double tube 130 in response to the turning of the nacelle 4 is not interfered. Further, the thrust load such as the weight of the first double tube and a hydraulic thrust caused by the high pressure oil and the low pressure oil flowing in the inner flow path 151 and the outer flow path 152, or the radial load can be firmly received by the bearings.

According to the above configuration, by rotatably connecting the first double tube 130 supported on the nacelle side to the second double 140, the high pressure oil and the low pressure oil can communicate between the hydraulic pump 8 in the nacelle 4 and the hydraulic motor 10 in the tower 2 via the first and second double tubes 130, 140 even when the nacelle 4 turns.

Further, the first double tube 130 and the second double tube 140 may be fitted so that the first inner tube 132 and the second inner tube 1420 are relatively slidable in the longitudinal direction and the first outer tube 134 and the second outer tube 144 are relatively slidable in the longitudinal direction.

By fitting the first and second double tubes 130, 140 together so that the first inner tube 132 is rotatable relative to the second inner tube 142 and the first outer tube 134 is rotatable relative to the second outer tube 144, the first double tube 130 is allowed to move in the longitudinal direction relative to the second double tube 140. By this, the heat expansion of the first double tube 130 and the second double tube 140 caused by an increase in the oil temperature or the like can be absorbed.

Between the wall surface of the first inner tube 132 and the wall surface of the second inner tube 142, an inner seal 155 may be provided. The inner seal 155 is interposed between the inner flow path 151 and the outer flow path 152. By arranging the inner seal 155 between the inner flow path 151 and the outer flow path 152, even when the sealing function of the inner seal 155 fails, the high pressure oil streaming in the inner flow path 151 leas to the outer flow path 152. Thus, it is possible to prevent the high pressure oil from leaking outside.

Further, between the wall surface of the first outer tube 134 and the wall surface of the second outer tube 144, a pair of outer seals 156, an oil reservoir 158 which communicates with the pair of outer seals 156 and an atmospheric tank 170 which communicates with the oil reservoir 158, may be provided.

By this, even when the sealing function of the pair of the outer seals 156 fails, the low pressure oil leaking from the outer flow path is led to the atmospheric tank 170 via the oil reservoir 158. More specifically, the low pressure oil having leaked from the outer flow path 152 is collected in the atmospheric tank 170 after the temperature of the low pressure oil is reduced sufficiently. Thus, it is possible to prevent the low pressure oil from leaking outside.

Furthermore, from the perspective of suppressing pulsation of the hydraulic pump 8, an anti-pulsation accumulator 160 may be provided in the nacelle 4 between the hydraulic pump 8 and the first double tube 130.

By providing the anti-pulsation accumulator 160 in the nacelle 4, the distance between the anti-pulsation accumulator 160 and the hydraulic pump 8 is reduced and the pulsation of the hydraulic pump 8 can be effectively prevented. The capacity of the anti-pulsation accumulator 160 may be comparatively small and thus, the anti-pulsation accumulator 160 can be adequately stored in the nacelle 4. Particularly, in the embodiment, the hydraulic motor 10 and the generator 12 are arranged on the tower side instead of the nacelle side and thus, there is enough space for the anti-pulsation accumulator 160 in the nacelle 4.

Between the second double tube 140 and the hydraulic motor 10, a hydraulic accumulator 161 may be provided. In the interior of the tower 2, a branch flow path 165 is provided to branch from the second high pressure piping 31b and the hydraulic accumulator 161 is connected to the branch flow path 165 via a relief valve 166. The capacity of the hydraulic accumulator 161 is substantially large compared to the anti-pulsation accumulator 160. The hydraulic accumulator 161 is used for the purpose of accumulating the pressure of the high pressure oil to absorb excess rotation energy in the event of gusts, accumulating the pressure of the high pressure oil to enable a ride-through function during the voltage drop of the grid, accumulating the pressure of the high pressure oil to absorb excess rotation energy when there is power surplus in the wind turbine generator, or the like.

While the present invention has been described with reference to exemplary embodiments, it is obvious to those skilled in the art that various changes may be made without departing from the scope of the invention.

In the above embodiments, the wind turbine generator 1 is described as a specific example of the power generating apparatus of renewable energy type. However, the present invention is also applicable to other types of power generating apparatuses of renewable energy type.

For instance, the present invention may be applied to a generator for generating power from tidal current, ocean current or river current. Such generator may be configured such that the tower extends vertically from the base part toward the end part in the sea or in the water and the main shaft rotates when the blade receives the tidal current, ocean current or river current.

REFERENCE SIGNS LIST

1 WIND TURBINE GENERATOR
2 TOWER
2A BASE PART
2B TOP END PART
4 NACELLE
6 ROTOR
6A HUB
6B BLADE
8 HYDRAULIC PUMP
10 HYDRAULIC MOTOR
11 OUTPUT SHAFT
12 GENERATOR
13 YAW DRIVE UNIT
14 MAIN SHAFT
15 MAIN SHAFT BEARING
16 NACELLE BASE PLATE
18 NACELLE BEARING
18A INNER RING
18B OUTER RING
31 HIGH PRESSURE PIPING
31a FIRST HIGH PRESSURE PIPING
31b SECOND HIGH PRESSURE PIPING
33 LOW PRESSURE PIPING
33a FIRST LOW PRESSURE PIPING
33b SECOND LOW PRESSURE PIPING
41 FRAME
42 SHELF
43 FLOOR
100, 100' CONNECTION PART

The invention claimed is:

1. A power generating apparatus of renewable energy type which generates power from renewable energy, the apparatus comprising:
a tower;
a nacelle which is provided at an end part of the tower;
a main shaft which is housed in the nacelle and rotates with a blade;
a hydraulic pump which is housed in the nacelle and is connected to the main shaft;
a hydraulic motor which is driven by operating oil supplied from the hydraulic pump;
a generator which is connected to the hydraulic motor; and
a piping which is provided between the hydraulic pump and the hydraulic motor to circulate the operating oil,
wherein the hydraulic motor is housed in at least one of the nacelle and an end part of the tower,
wherein the generator is housed in at least one of the nacelle and the end part of the tower, and
wherein at least one of the hydraulic motor and the generator is housed in the nacelle and arranged in a space excluding an area between: the main shaft and the hydraulic pump; and a rear end wall surface of a wall of the nacelle, the rear end wall surface being on a side farther from the blade.

2. The power generating apparatus of renewable energy type according to claim 1,
wherein the power generating apparatus of renewable energy type is a wind turbine generator,
wherein the tower extends vertically upward from a base part toward the end part, and
wherein the main shaft is rotated by wind received by the blade.

3. The power generating apparatus of renewable energy type according to claim 1,
wherein the hydraulic motor is connected to the generator via a flexible joint.

4. A power generating apparatus of renewable energy type which generates power from renewable energy, the apparatus comprising:
a tower;
a nacelle which is provided at an end part of the tower;
a main shaft which is housed in the nacelle and rotates with a blade;
a hydraulic pump which is housed in the nacelle and is connected to the main shaft;
a hydraulic motor which is driven by operating oil supplied from the hydraulic pump;
a generator which is connected to the hydraulic motor;
a piping which is provided between the hydraulic pump and the hydraulic motor to circulate the operating oil; and
a yaw drive unit which is provided at a lower part of the nacelle to turn the nacelle,
wherein the hydraulic motor is housed in at least one of the nacelle and an end part of the tower,
wherein the generator is housed in at least one of the nacelle and the end part of the tower,
wherein at least one of the hydraulic motor and the generator is arranged in a space excluding an area between: the main shaft and the hydraulic pump; and a rear end wall surface of a wall of the nacelle, the rear end wall surface being on a side farther from the blade, and
wherein at least one of the hydraulic motor and the generator is arranged above the yaw drive unit and lateral to the hydraulic pump.

5. The power generating apparatus of renewable energy type according to claim 4,
wherein the hydraulic motor and the generator are housed in the nacelle and are arranged in a substantially horizontal direction, and
wherein at least a part of the hydraulic motor and the generator being connected to each other via an output shaft, is arranged lateral to the hydraulic pump.

6. The power generating apparatus of renewable energy type according to claim 4,
wherein the hydraulic motor is supported on a nacelle side by a support member and is arranged in an upper part of the tower.

7. A power generating apparatus of renewable energy type which generates power from renewable energy, the apparatus comprising:
a tower;
a nacelle which is provided at an end part of the tower;
a main shaft which is housed in the nacelle and rotates with a blade;
a hydraulic pump which is housed in the nacelle and is connected to the main shaft;
a hydraulic motor which is driven by operating oil supplied from the hydraulic pump;
a generator which is connected to the hydraulic motor; and
a piping which is provided between the hydraulic pump and the hydraulic motor to circulate the operating oil, wherein the hydraulic motor is housed in at least one of the nacelle and an end part of the tower, wherein the generator is housed in at least one of the nacelle and the end part of the tower, wherein at least one of the hydraulic motor and the generator is arranged in a space excluding an area between: the main shaft and the hydraulic pump; and a rear end wall surface of a wall of the nacelle, the rear end wall surface being on a side farther from the blade, wherein the nacelle is supported rotatably in a yaw direction with respect to the tower, wherein the hydraulic motor and the generator are supported on a nacelle side by a support member and the hydraulic motor is connected to the hydraulic pump by the piping so that the hydraulic motor is immovable relative to the hydraulic pump in the yaw direction, and wherein at least a part of the hydraulic motor and the generator being connected to each other via an output shaft, is arranged in an upper part of the tower.

8. The power generating apparatus of renewable energy type according to claim 7, wherein the hydraulic motor is housed in the nacelle, and wherein the hydraulic motor and the generator are arranged so that the output shaft is disposed vertically.

9. A power generating apparatus of renewable energy type which generates power from renewable energy, the apparatus comprising:

a tower;

a nacelle which is provided at an end part of the tower;

a main shaft which is housed in the nacelle and rotates with a blade;

a hydraulic pump which is housed in the nacelle and is connected to the main shaft;

a hydraulic motor which is driven by operating oil supplied from the hydraulic pump;

a generator which is connected to the hydraulic motor;

a piping which is provided between the hydraulic pump and the hydraulic motor to circulate the operating oil; and at least one support member which is supported by the tower, wherein the hydraulic motor is housed in at least one of the nacelle and an end part of the tower wherein the generator is housed in at least one of the nacelle and the end part of the tower, wherein at least one of the hydraulic motor and the generator is arranged in a space excluding an area between: the main shaft and the hydraulic pump; and a rear end wall surface of a wall of the nacelle, the rear end wall surface being on a side farther from the blade, wherein at least one of the hydraulic motor and the generator is fixed to the support member, and wherein one end of the piping connected to the hydraulic pump and other end of the piping connected to the hydraulic motor are rotatably connected relative to each other in a yaw direction.

10. The power generating apparatus of renewable energy type according to claim 9, further comprising:

a plurality of first pipings which are supported on a nacelle side and are connected to the hydraulic pump; and a plurality of second pipings which are disposed farther from the nacelle than the first pipings and which are fitted to the first pipings, wherein the first pipings supported on the nacelle side are rotatably connected to the second pipings, wherein high pressure oil discharged from the hydraulic pump flows in a first flow path formed by putting at least one set of the first piping and the second piping into communication, and wherein low pressure oil discharged from the hydraulic motor flows in a second flow path formed by putting at least one of remaining sets of the first piping and the second piping into communication.

11. The power generating apparatus of renewable energy type according to claim 10, wherein in at least one of the first flow path and the second flow path, a cable extending between the nacelle and the tower is housed, and wherein the cable is covered by a covering tube which the operating oil is prevented from entering.

12. The power generating apparatus of renewable energy type according to claim 9, further comprising:

a first double tube which includes a first inner tube and a first outer tube connected to the hydraulic pump and which is supported on a nacelle side and extends through an interior of the tower toward a base part of the tower; and a second double tube which includes a second inner tube and a second outer tube connected to the hydraulic motor and which is disposed farther from the nacelle than the first double tube and is fitted to the first double tube, wherein the first inner tube is in communication with the second inner tube to form an inner flow path, wherein the first outer tube is in communication with the second outer tube to form an outer flow path, wherein low pressure oil discharged from the hydraulic motor to the hydraulic pump flows in one of the inner flow path and the outer flow path, wherein high pressure oil discharged from the hydraulic pump to the hydraulic motor flows in the other of the inner flow path and the outer flow path, and wherein the first double tube supported on the nacelle side is connected rotatably to the second double tube.

13. The power generating apparatus of renewable energy type according to claim 12, further comprising:

an inner seal which seals a space between a tube wall of the first inner tube and a tube wall of the second inner tube, wherein the inner seal is interposed between the inner flow path and the outer flow path.

14. The power generating apparatus of renewable energy type according to claim 12, further comprising:

a pair of outer seals which seal a space between a tube wall of the first outer tube and a tube wall of the second outer tube;

an oil reservoir which communicates with the pair of outer seals; and a tank which communicates with the oil reservoir.

15. The power generating apparatus of renewable energy type according to claim 12, further comprising:

a bearing which rotatably supports the first double tube to the second double tube and which receives at least one of a thrust load and a radial load along a longitudinal direction and a radial direction, respectively, of the first and second double tubes.

16. The power generating apparatus of renewable energy type according to claim 12, wherein the first double tube and the second double tube are fitted so that the first inner tube and the second inner tube are relatively slidable in a longitudinal direction and the first outer tube and the second outer tube are relatively slidable in the longitudinal direction.

17. The power generating apparatus of renewable energy type according to claim 12, further comprising:
   an anti-pulsation accumulator which is provided in the nacelle between the hydraulic pump and the first double tube to prevent pulsation of the hydraulic pump.

18. The power generating apparatus of renewable energy type according to claim 9,
   wherein the hydraulic motor and the generator are housed in the tower, and
   wherein the hydraulic motor and the generator are disposed in a substantially vertical direction.

\* \* \* \* \*